Feb. 8, 1972   H. R. JENKS   3,641,230
METHOD FOR MAKING PRESTRESSED LAMINATED FIBER GLASS STRUCTURES
Filed Jan. 21, 1969   4 Sheets-Sheet 1
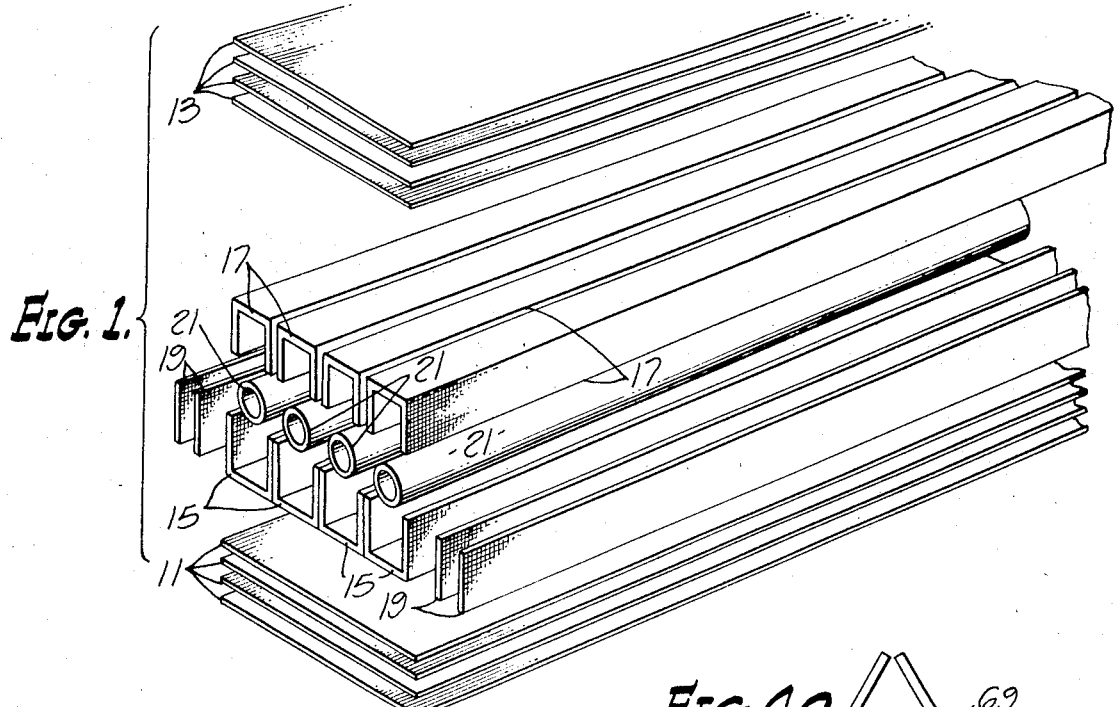
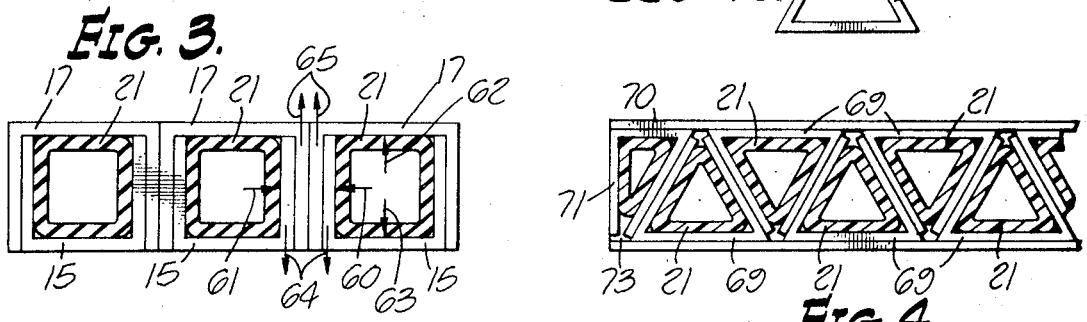
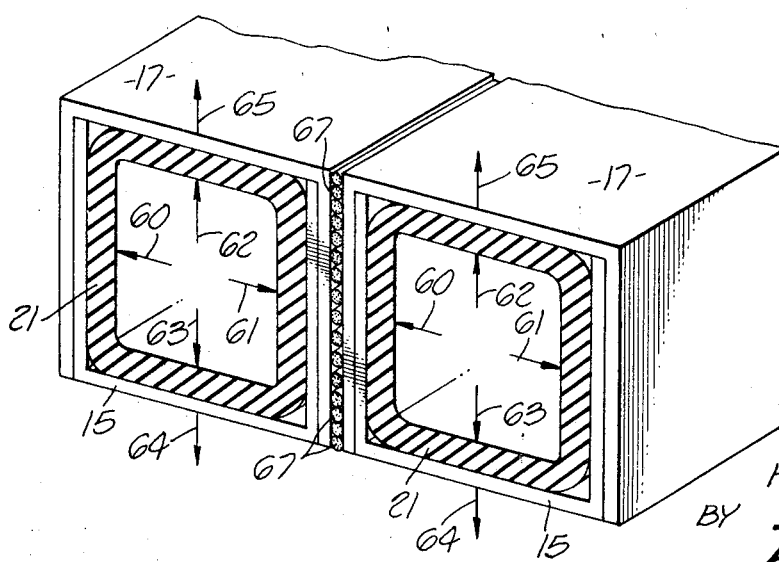
INVENTOR
HERBERT R. JENKS
BY
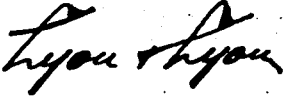
ATTORNEYS Feb. 8, 1972  H. R. JENKS  3,641,230
METHOD FOR MAKING PRESTRESSED LAMINATED FIBER GLASS STRUCTURES
Filed Jan. 21, 1969  4 Sheets-Sheet 3

INVENTOR
HERBERT R. JENKS
BY Lyon & Lyon
ATTORNEYS

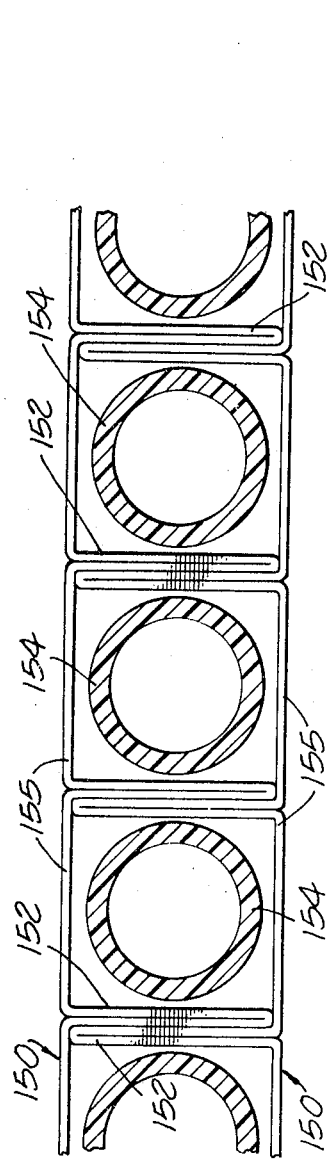
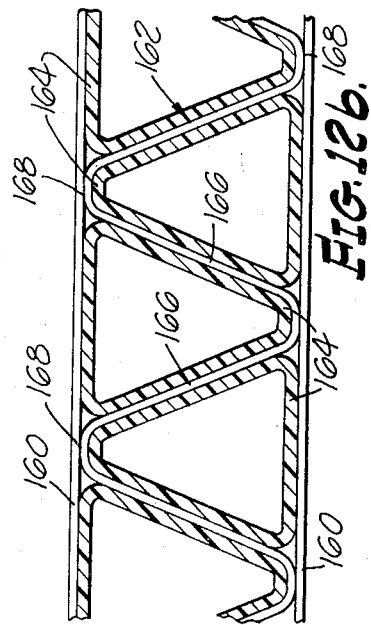
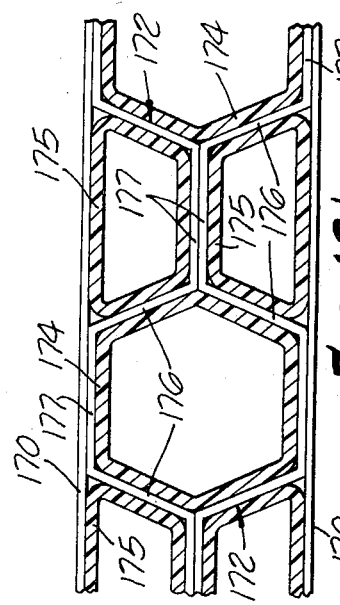
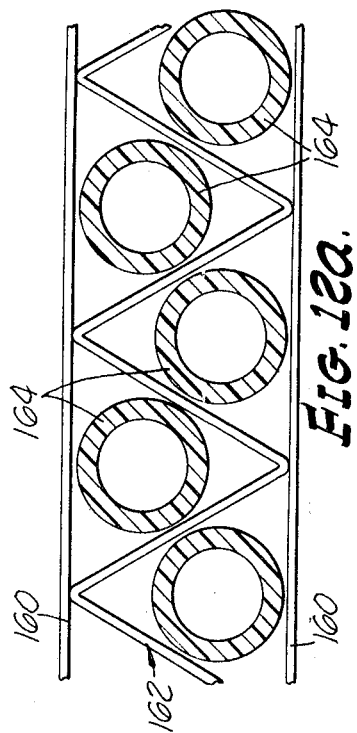
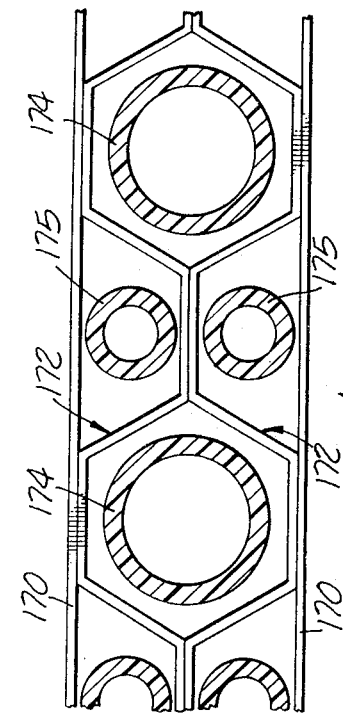

United States Patent Office 3,641,230
Patented Feb. 8, 1972

3,641,230
METHOD FOR MAKING PRESTRESSED LAMINATED FIBER GLASS STRUCTURES
Herbert R. Jenks, Santa Ana, Calif., assignor to Dura Fiber, Inc., Costa Mesa, Calif.
Continuation-in-part of applications Ser. No. 643,926, June 6, 1967, Ser. No. 674,958, Oct. 12, 1967, and Ser. No. 696,458, June 8, 1968. This application Jan. 21, 1969, Ser. No. 792,587
The portion of the term of the patent subsequent to Feb. 3, 1987, has been disclaimed
Int. Cl. B29c 27/14
U.S. Cl. 264—152
20 Claims

ABSTRACT OF THE DISCLOSURE

A method of molding fiber glass for structural applications to provide a unitary structure having outer skins separated by a plurality of ribs or trusses, whereby the skins and the ribs are prestressed. The outer dimensions can be made in virtually any shape dependent upon the shape of the mold in which the structure is fabricated, and the interior of the structure between the ribs is hollow. The method also makes possible the fabrication of tubular or semitubular members having a prestressed skin but no interior ribs. The method involves the use of a plurality of elastomeric bags or tubular members which are pressurized during a heating and molding cycle and which contribute to the prestressing of the fiber glass elements. In addition, the invention involves the method by which the various laminates are laid up and the manner in which the elastomeric bags interact with the laminates, so laid up, during the molding cycle.

BACKGROUND OF THE INVENTION

The present invention relates generally to fiber glass structures of virtually any shape in which there is a common condition of a surrounding prestressed skin, and which may also include a plurality of ribs or trusses between the skins which are designed to be load bearing. The interior of the structure between the ribs is preferably hollow and the ribs and the skins are formed integrally. This is a continuation-in-part of my following co-pending applications: "Laminated Fiber Glass Ski and Process for Making the Same," Ser. No. 643,926, filed June 6, 1967; "Laminated Fiber Glass Diving Board," Ser. No. 674,958, filed Oct. 12, 1967, now U.S. Pat. No. 3,493,240; "Laminated Fiber Glass Tennis Racket and Method and Apparatus for Making the Same," Ser. No. 696,458, filed June 8, 1968, now abandoned in favor of a continuation-in-part application bearing the same title, Ser. No. 11,112 filed May 8, 1970. These previously filed applications refer to specific uses of the process for the construciton of particular items, as well as to finished products themselves.

Various methods have been proposed heretofore for the construction of structural members using a core-type construction of molded fiber glass material. Many such constructions have even included the combination of skins separated by ribs, all of which are molded in one piece. Previous constructions have not demonstrated the degree of strength and resiliency exhibited by members made in accordance with the present invention. Particularly, such poor performance has been because such previous structures have not been prestressed. The previous constructions have ordinarily obtained a truss-like construction by wrapping the glass fibers over mandrels which are later removed or wrapping them around other core materials such as Styrofoam which may be left in place. The drawback of such method of construction is that the orientation of fibers is substantially determined at the time the cores or mandrels are wrapped with the fiber glass cloth and no realignment or change is made therein during the curing process. The result is that little or no prestressing of the structure is possible and there is no assurance that alignment of the fibers in the desired manner will be obtained after curing. The wrapping of the mandrels severely limits the ability to orient the fibers in a manner which would otherwise give desired strength and resilience characteristics.

By prestressing it is meant that the glass fibers which are held by the resin are all aligned in a desired manner and placed in tension. Under tension loads only those fibers which are straight will take the load and if some of the fibers are straight and under tension and others are kinked, all of the load will be carried by the straight fibers and failure will occur in the straight fibers before it does in the kinked fibers. The result is that the structure can bear only a portion of its potential load. Under compression, fibers which are kinked will fail by bending rather than compression.

In U.S. Pat. 3,270,111 issued Aug. 30, 1966, to G. Haldemann a process is disclosed purporting to prestress the glass fibers, but the limitations of that process are such that adequate prestressing cannot be obtained except under ideal conditions because the pressure tubes cannot be uniformly wrapped when under partial pressure. In addition, Haldemann is limited to a wrapping procedure which is not satisfactory for all purposes.

SUMMARY OF THE INVENTION

It is an object, therefore, of the present invention to provide an improved process for forming structural panels and the like from fiber glass and resin.

It is a further object of the present invention to provide a method for making a prestressed fiber glass panel.

It is a particular object of the present invention to provide a method for forming a fiber glass structural panel or the like including placing as many of the glass fibers as possible under tension during the molding and through the curing cycle.

It is also an object of the present invention to provide a method of making prestressed structural fiber glass panels and the like by using an internal pressure means which not only properly orients the various glass fibers but also straightens them and places them under tension.

Specifically, the object of the invention is to provide a process of making prestressed fiber glass structures by laminating initially dry, resin-impregnated sheets in overlapping relation whereby an internal expansion means prestresses the fibers and orients them at the same time.

DESCRIPTION OF THE DRAWINGS

FIG. 1 is an exploded perspective view of one laminating method.

FIG. 3 is an end elevation, partially in section, demonstrating the method by which the fibers are prestressed.

FIG. 4 shows one variation in the process by which non-perpendicular ribs may be formed.

FIG. 5 is an enlarged perspective view further demonstrating the prestressing technique.

FIG. 11 is an end elevation, demonstrating another method of forming a prestressed structure using continuous, prefolded skin sheets.

FIG. 12a and 12b are end elevations showing further alternative lamination techniques.

FIGS. 13a and 13b are end elevations showing further alternative lamination techniques.

DESCRIPTION OF THE INVENTION

Figure 2:
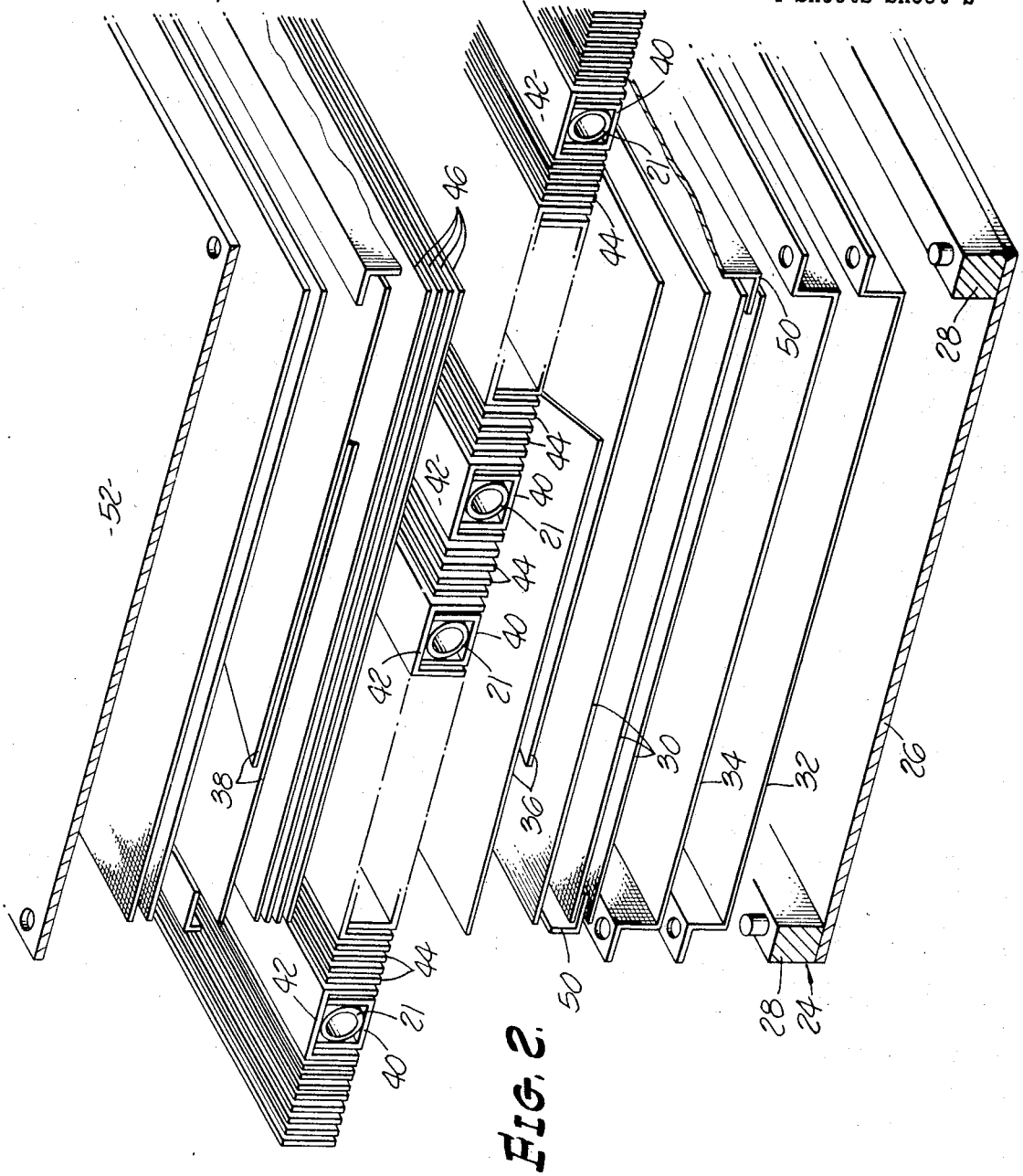
FIG. 2 is an exploded perspective view showing some variations in the laminating procedure of FIG. 1.

The exploded view of FIG. 1 shows, as a preferred embodiment, a typical series of laminations to form the upper and lower skins and the central supporting ribs. Forming the bottom skin are a plurality of resin-impregnated glass cloth strips 11 which may be cut to the outer dimension required to fill whatever mold they might be placed in. The upper skin is similarly formed of a plurality of sheets 13 similar to the sheets 11 and cut in similar dimensions. The number of sheets 11 and 13 will vary depending upon the thickness of the skins desired. Intermediate the sheets 11 and 13 are placed a plurality of longitudinal U-shaped channel members 15 and 17 placed in side-by-side relationship. The U-shaped channel members 15 are placed with their open side up and their closed portion downward adjacent the lower skin sheets 11. The second series of U-shaped channel members 17 are positioned next above the channel members 15 but are so positioned with their open side facing downwardly so as to interlock with the channel members 15 to form hollow rectangular core sections. Channel members 15 and 17 are pre-cut and folded in the manner shown and being dry, resin-impregnated they are semi-rigid so that they will remain in the desired position until curing is completed. Along the outside edges of the core material, there may be positioned a plurality of side strips 19, on each side, to further enhance the rigidity at the edges and to protect the outer core section.

The mode of assembly of the above-mentioned laminates in a mold should be readily apparent. First the lower sheets 11 are placed in the mold and then the channel members 15 are positioned therein as desired. Following that, in each of the open channels presented by the members 15, there are placed tubular members 21. The members 21 are elastomeric material having a circular cross-section and extending substantially the entire length of the channels formed by the members 15. Following insertion of each of the elastomeric tubes 21, the side strips 19 may be placed in position and then the upper channel members 17 are put into place, following which the top sheets 13 are finally positioned.

As set forth in my copending applications for the ski (Ser. No. 643,926) and the diving board (Ser. No. 674,958), various applications of this lamination technique may require the use of additional sheets of laminates of either unidirectional or bidirectional weave glass cloth in order to achieve different performance characteristics for the finished product. For example, in the construction of a fiber glass ski, it is necessary to include upper and lower covering sheets, the lower one being to provide the proper running surface for a ski and the top being provided for decorative purposes. Similarly, in the construction of a diving board there are not only additional sheets adhering to the outer skin of the structure but interior laminations may be placed on a diagonal in order to achieve different bending characteristics.

Referring to FIG. 2 there is shown a series of laminations similar to that shown in FIG. 5 of application Ser. No. 674,958 in which some of these additional laminations can be seen. In FIG. 2, the bottom of the mold is shown at 24 having a flat bottom plate 26 and a series of longitudinal side rails 28. The bottom skin sheets corresponding to the sheets 11 of FIG. 1 are shown at 30 in FIG. 2. Additional sheets which form part of the skin but are also primarily for other reasons are shown at 32 and 34. It will be seen by referring to applicant's application for the diving board above-mentioned, that sheet 32 may be a rubber material to provide a non-skid surface as desired for a diving board. FIG. 2 shows a sheet 32 which may be of any material desired to be adhered to the outer surface and edges of the finished panel. In order to adhere a different type of material to sheet 34, it should be a relatively open weave glass cloth so that the material of sheet 32 will become imbedded or interlocked in the interstices of the weave of sheet 34.

The use of diagonal elements to change the bending characteristics of a panel is shown in FIG. 2 by the sheets 36 and 38. The upper and lower channel members 40 and 42 are similar to those shown in FIG. 1 but FIG. 2 also demonstrates the use of additional vertically disposed strips 44 between each of the channel members in order to provide increased rigidity in the ribs formed in the final product. The use of these extra strips and the number used is determined by the requirements of the construction in question. The upper skin sheets are shown at 46 and any material desired to be adhered to the upper surface of the finished product, i.e., to the skin thereof, is shown at 48. Again, this may be a glass fiber material or some other substance as desired. FIG. 2 also demonstrates the use of side channel elements 50 which interlock with portions of the lower skin sheets 30 and surround the upper skin sheets 46 encompassing the channel members to tie together the top and bottom layers.

Following the disposition of the various laminates according to the steps above-outlined, the upper mold plate 52 (FIG. 2) is secured in place and the elastomeric tubes 21 are connected to a source of air or steam pressure. The other end of the elastomeric tubes 21 are closed so that the connection of the open ends to the pressure source creates an expansible bag inside the channel members.

The securing of the upper mold plate 52 provides one means of applying external pressure to the parts being molded. It is also possible to use external pressure exerting means to confine the parts during the ensuing curing stage. The entire structure is placed in a chamber which is heated, thereby causing the resin with which all of the fiberglass sheets have been impregnated to become soft and then to cure. As soon as the resin becomes soft and tacky, internal pressure is applied to the elastomeric bags 21 thereby causing the hollow rectangular channels to expand so that the composite fiberglass structure fills the interior of the mold. It is this expansion of the fiber glass laminates after the resin has become tacky which creates a prestress situation in the glass fibers. Reference to FIG. 3 will further clarify this feature.

FIG. 3 shows just the upper and lower channel members 17 and 15 with the elastomeric bags 21 in place. As pressure is applied inside the bags 21, pressure will be exerted laterally in the direction of arrows 60 and 61 thereby pressing together the four vertical portions of the adjacent channel members 17 and 15. Since the resin with which these members have been impregnated has been allowed to become tacky, the lateral pressure supplied in the directions of arrows 60 and 61 will cause those vertical elements to stick together. Pressure inside the bags 21 also exerts pressure in a vertical direction as shown by the arrows 62 and 63. This tends to force apart the channel members 17 and 15 causing relative motion of the vertical portions thereof in a direction of the arrows 64 and 65. This vertical relative motion of the side walls coupled with the fact that lateral pressure has caused them to adhere together causes the vertically oriented fibers therein to be straightened out and placed under tension and the composite structure is allowed to cure in this condition thereby prestressing the rib portions of the structure.

The configuration of the elastomeric bags 21 shown in FIGS. 1 and 2 is cylindrical having a circular inner and outer cross-section. It is also contemplated that there may be different configurations for the elastomeric bags 21 wherein the bags retain the cylindrical center bore but are provided with a semirectangular configuration with the corners slightly radiused. Since the walls are thus thinner at the centers of the walls, an increased amount of lateral and vertical expansion will be exerted at those points. This will increase the above-described process of causing the lateral and vertical walls to adhere to their adjacent laminates during the initial steps of the prestressing cycle. The radiusing of the corners helps to control the shape of the corners of the cells and causes the formation of smooth fillets where the ribs join the skin. In addition, if the first or second layers of skin sheets are made up of unidirectionally oriented fibers, the increased expansion at the centers of the thin bag will cause a separation of the unidirectional fibers and a migration of them toward these corners where the pressure is lower which will augment the formation of fillets. This may also be accomplished by inserting strips of unidirectional fibers such as that shown at 67 between the U-shaped channel members, whereupon the increased lateral pressure at the center wall of the bag will likewise cause a migration of the unidirectional fibers toward the corners.

FIG. 4 shows one variation of the configuration of the core members although many variations might be made therein within the teaching of this invention. The modification in FIG. 4 is to change the rectangular configuration of the core members to that of a triangular one whereupon the rubs will dispose at alternating angles. This triangular core is made by pre-folding the channel members as a triangle such as shown in FIG. 4a as element 69. Elements 69 are slit down one edge so they will be open along one of the apices thereof. The core section of a panel 70 is made by merely placing these members 69 in alternating fashion with the open apex either facing upwardly or downwardly. To fill the remaining gap of a rectangular mold, a half-sized channel member 71 is provided which will likewise have an open end at the apex 73. The elastomeric bags 21 of customary circular cross-section are used; however, it is also contemplated that tubes may be extruded having a circular center hole and a triangular outside surface with radiused apices. This again provides thin side walls in the bag so that the thin wall expands first under pressure pressing the sides of the core cells together as previously described. The radiusing of the corners shapes the interior cell corners to provide smooth fillets.

After the laminated structure has been placed in the mold, heated, and then internal pressure applied to the elastomeric bags, the construction is left for a period of time sufficient to cure the resin, a time period which will vary according to the composition of the resin used. In some situations it has been found advantageous to relax the pressure in the bags somewhat during the initial application and then reapply the pressure in order to insure proper expansion of the materials in the mold.

Figure 6:
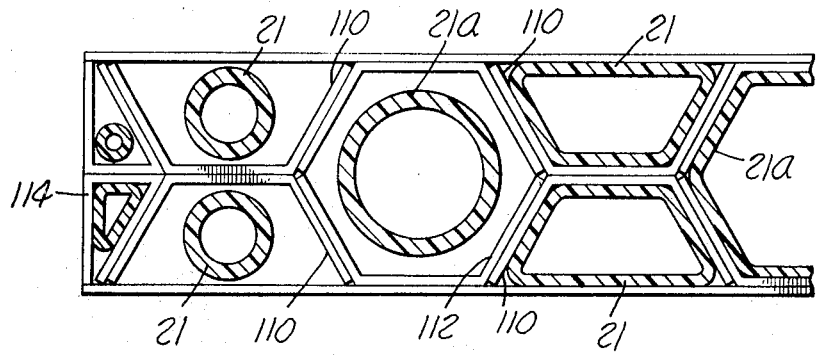
FIG. 6 and FIG. 7 are end elevations showing other embodiments of the invention.
Figure 7:
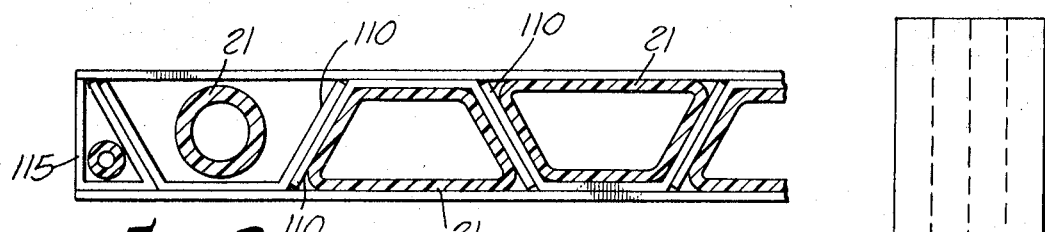

FIGS. 6 and 7 show what further embodiments of the invention can produce. By appropriately cutting the channel members, almost any desired configuration of ribs can be formed. In FIG. 6, the channels are of the two sizes. The smallest core 110 is an open sided trapezoidal shape, with the closed sides contiguous. The large core 112 is a hexagonal shape. FIG. 6 requires pressure bags of different sizes, especially for the large core 112. Again these are preferably cylindrical bags 21 and 21a but may have an outer configuration corresponding to the configuration of the core 110 or 112. FIG. 6 shows some of the bags 21, 21a expanded and others relaxed.

FIG. 7 shows the use of a single course of the smaller cores 110, alternating in disposition. Pressure bags 21 are shown both expanded and retracted. For edges of a panel, for example, it may be necessary to use small edge cores such as 114 and 115. It is important to note that in FIGS. 6 and 7 there are contiguous side pieces of adjacent core elements so that upon expansion of the bags 21 the previously described sticking and stretching operation takes place to prestress the ribs, as well as to prestress the skin sides thereof.

Figure 8:
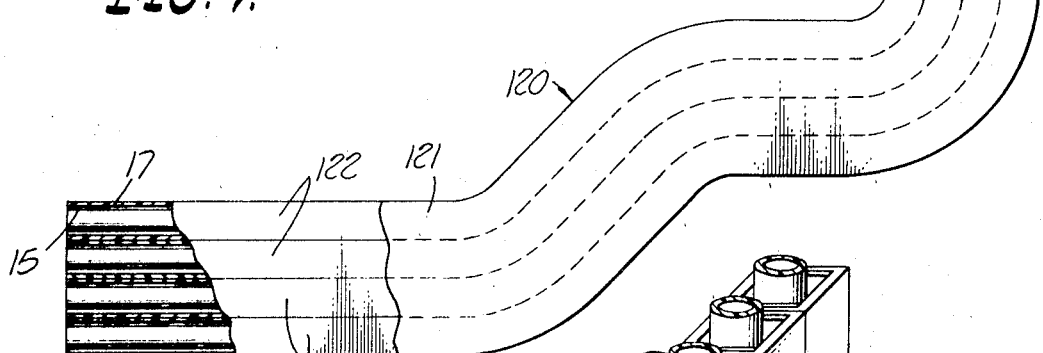
FIG. 8 is a plan view showing how complex shapes can be made in planar structures using the present invention.

FIG. 8 demonstrates the ready application of the present invention to panels of complex shape. Because the core sections run longitudinally within the panel, they may be bent to follow many different contours. In this regard, the present invention differs drastically from the honeycomb-type laminates because the latter cannot be made to follow lateral contours in this manner. FIG. 8 shows a long curved panel 120 with top skin 121 in place. Skin 121 is cut away to show the four (in this case) channels or cores 122, which are in turn cut away to show the upper and lower channel members 17 and 15. The channel members can be easily bent to follow any contour.

Figure 9:
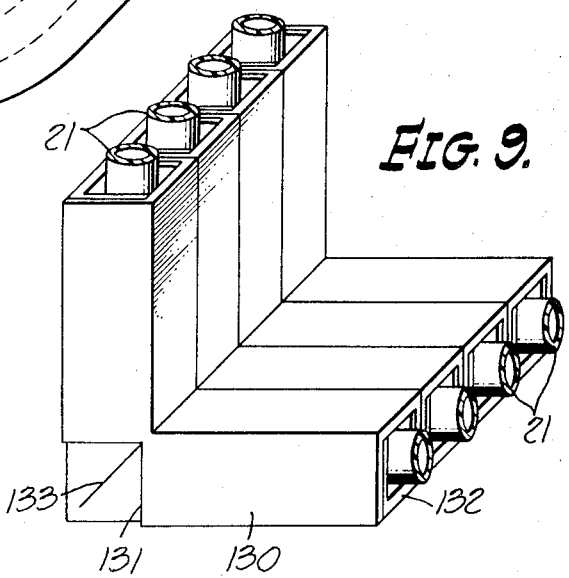
FIG. 9 is a partial perspective view showing how other nonplanar structures may be made.

FIG. 9 shows another form of the invention by which nonplanar structures may be formed. By appropriately cutting the channel members, angle bends may be made, even at right angles. Channel 130 is slit at each side at 131 so it can open up as shown. Channel 132 is notched at 133 so it will close up when folded to the desired angle. The pressure bags 21 are sufficiently pliable to be bent around such corners, yet still expand to function as described.

Figure 10:
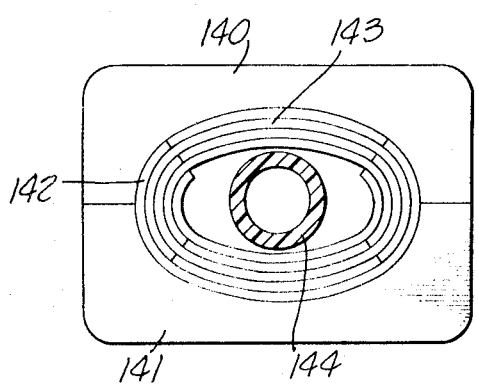
FIG. 10 is a sectional elevation of another embodiment of the invention for making noncircular structural members.

FIG. 10 shows an example of how the present invention can be employed to produce noncircular structures. Mold halves 140 and 141 are made having the desired finished contour. A series of laminates 142, 143 are laid into the mold each in overlapping relationship around the pressure bag 144. When the mold is closed and the bag pressurized the sticking and stressing operation will occur as previously desribed to produce a unitary structure in which the fibers are all aligned and prestressed.

FIG. 11 shows a somewhat simplified form of the invention which eliminates some of the steps. This embodiment entails only the prefolding of the resin-impregnated sheets 150, with double folded vertical portions 152. All the sheets 150 may be folded in identical manner. They are then placed in a mold with the portions 152 contiguous and the pressure bags 154 inserted in the spaces formed therebetween. The remainder of the curing process is the same. The fiber orientation and stretching operation will occur much the same as described before for FIG. 3. Portions 152 will tend to adhere to one another and internal pressure will tend to place them under tension. Similarly, the expansion of the bags 154 will stretch portions 155 as well, thereby prestressing the skin.

FIGS. 12a and 12b show still another embodiment of the invention. Here, continuous upper and lower skin sheets 160 are used, as before, but the process comprises prefolding a continuous zigzag core sheet 162 and inserting it between sheets 160. Pressure bags 164 are inserted in the triangular cores thus formed. FIG. 12b demonstrates what occurs during the curing cycle. When the resin is softened by the heat, the fibers are relatively free to move about. When pressure is supplied in bags 164, they'll tend to flatten out the apices of each triangular core where it contacts the skin at 168. This obviously requires a shorter side wall 166, and thus the fibers in side wall 166 are placed under tension. Similarly, the flattened portion 168 undergoes some stretching as it is laid down against the skin.

FIGS. 13a and 13b shows yet another variation in the process. In this embodiment, continuous upper and lower skins 170 are used and continuous core-forming sheets 172 are used as well. These sheets 172 are pre-folded and being dry and resin-impregnated they will remain in their folded configuration until cured, thereby making handling easier. The use of all continuous sheets 170, 172 may be most desirable for fabricating large panels. In FIG. 13a, sheets 172 have been folded in a trapezoidal pattern and when positioned as shown, form the hexagon-trapezoid pattern like FIG. 6. Pressure bags 174 and 175 are inserted as before. FIG. 13b shows the bags 174 and 175 pressurized. The stretching action of the fibers takes place as a result of the angle of the sides 176, as the pressure exerts a lateral force tending to elongate the narrow base 177 of each core. As each base 177 becomes longer, the sides shorten and the angle of the sides becomes more nearly vertical. Thus the fibers in the sides 176 and in the bases 177 are all tensioned.

While a particular series of steps has been shown as embodying the process of this invention, it will be obvious that changes or modifications in those steps might be made without departing from this invention in its broader aspects. It is contemplated that changes in the various laminating steps and in the manner by which the core sections are oriented might be made as well as several other changes or modifications. It is the aim of the appended claims to cover all such changes and modifications as fall within the true scope and spirit of this invention.

I claim:

1. A process for fabricating prestressed fiber glass articles, the steps comprising:
   forming a mold having the desired configuration of the finished product;
   cutting a plurality of dry, resin-impregnated fiber glass sheets so that they will fit in said mold;
   placing said sheets in said mold with at least a portion thereof so disposed as to form a hollow core, the sheets forming said core and the sheets contiguous thereto being disposed in overlapping relationship;
   inserting expansible means in said hollow core;
   closing said mold to provide external pressure, and then heating the same until the resin becomes tacky; then, applying pressure to said expansible member and maintaining said heat and pressure until the resin has cured.

2. A process for fabricating prestressed fiber glass articles, the steps comprising:
   forming a mold having the desired configuration of the finished product;
   first placing in the mold a plurality of resin-impregnated sheets of fiberglass to form a first skin;
   cutting and folding a plurality of said fiber glass sheets to form core members;
   next placing in the mold said plurality of longitudinally extending hollow core members, contiguous portions of said core member being disposed in overlapping relationship;
   inserting internal pressure means into said hollow core members;
   then filling the mold with a plurality of resin-impregnated sheets of fiberglass to form a second skin;
   exerting external pressure on said mold and heating said mold to initiate curing of the resin;
   then applying internal pressure by said internal pressure means, and maintaining said heat and pressure until the resin has cured; and
   removing the cured article from the mold and withdrawing the pressure means from the hollow cores.

3. The process of claim 2 further including the step of inserting strips of resin-impregnated fiber glass between said hollow core members and between said hollow core members and the lateral edges of the mold, a portion of said strips having longitudinally oriented unidirectional fibers.

4. The process of claim 3 wherein some of the fiber glass sheets have a bidirectional weave and some have a unidirectional weave, the unidirectional fibers being oriented parallel to the orientation of the pressure means.

5. The process of claim 2 further including the steps of first extruding the pressure means of an elastomeric material in a cylindrical configuration.

6. The process of claim 2 wherein the step of folding said sheets to form core members comprises folding strips of fiberglass material into rectangular, U-shaped channel members, said U-shaped member being inserted in said mold in interlocking manner to form said hollow cores.

7. The process of claim 2 wherein the step of folding said sheets to form core members comprises folding strips of fiber glass material into triangular core members.

8. The process of claim 2 wherein the step of folding said sheets to form core members comprises folding strips of fiberglass material into nonrectangular channel members.

9. The process of claim 2 further including the steps of first extruding the pressure means of an elastomeric material in a tubular configuration having a circular interior surface and an outer surface conforming to the shape of the interior surface of said core members.

10. The process of claim 6 wherein said extrusion step comprises forming the outer surface of said pressure means substantially rectangular, then radiusing the corners thereof.

11. The process of claim 6 wherein said extrusion step comprises forming the outer surface of said pressure means substantially triangular, then radiusing the corners thereof.

12. The process of claim 6 wherein said extrusion step comprises forming the outer surface of said pressure means substantially non-rectangular, then radiusing the corners thereof.

13. The process of claim 2 further including the step of inserting additional resin-impregnated sheets above and below said core members, orienting the fibers of some of said additional sheets diagonally with respect to the major axis of the mold.

14. The process of claim 1, in which the steps include slitting the core members longitudinally to form at least one pair of unconnected side walls, the side walls of adjacent core members being placed in overlapping relationship.

15. A process for fabricating prestressed fiber glass articles, the steps comprising:
   forming a mold having the desired configuration of the finished product;
   cutting a plurality of dry, resin-impregnated sheets of fiberglass to fit into said mold;
   folding a portion of said sheets into central rib segments whereby both skin portions and rib portions are provided;
   inserting said sheets in said mold and positioning them in such a manner that said ribs form hollow cores between said skins;
   inserting internal pressure means into said cores;
   applying external pressure to said mold and heating said mold to initiate curing of the resin;
   then applying pressure to said internal pressure means, and maintaining said heat and pressure until the resin has cured.

16. The process of claim 15 wherein said cutting and folding steps comprise forming continuous upper and lower skin sheets, folding said sheets with vertical rib segments, said rib segments being placed contiguously when said sheets are inserted in said mold whereby hollow cores are formed therebetween.

17. The process of claim 15 wherein said cutting and folding steps comprise forming continuous upper and lower skin sheets, folding continuous rib sheets, said rib sheets adapted to form hollow cores between said skin sheets when inserted in said mold.

18. The process of claim 17 wherein said rib sheets are folded in a zigzag pattern so as to form triangular cores.

19. The process of claim 17 wherein said rib sheets are folded in a trapezoidal pattern.

20. The process of claim 1, further including slitting one or more of the side walls of said core-forming members so as to permit the orientation thereof in a nonlinear fashion in said mold.

References Cited

UNITED STATES PATENTS

| | | | |
|---|---|---|---|
| 2,445,290 | 7/1948 | Gonda | 264—255 X |
| 2,749,266 | 6/1956 | Eldred | 264—137 |
| 2,980,158 | 4/1961 | Meyer | 154—1 |
| 3,138,506 | 6/1964 | Ross | 156—147 |
| 3,205,288 | 9/1965 | Bates | 264—313 X |
| 3,215,762 | 11/1965 | Phelps | 264—152 |
| 3,270,111 | 8/1966 | Haldemann | 264—313 X |

ROBERT F. WHITE, Primary Examiner

R. R. KUCIA, Assistant Examiner

U.S. Cl. X.R.

264—137, 229, 314, 316